Nov. 2, 1965 J. G. BARQUERO 3,214,835
COMPASS
Filed June 20, 1962
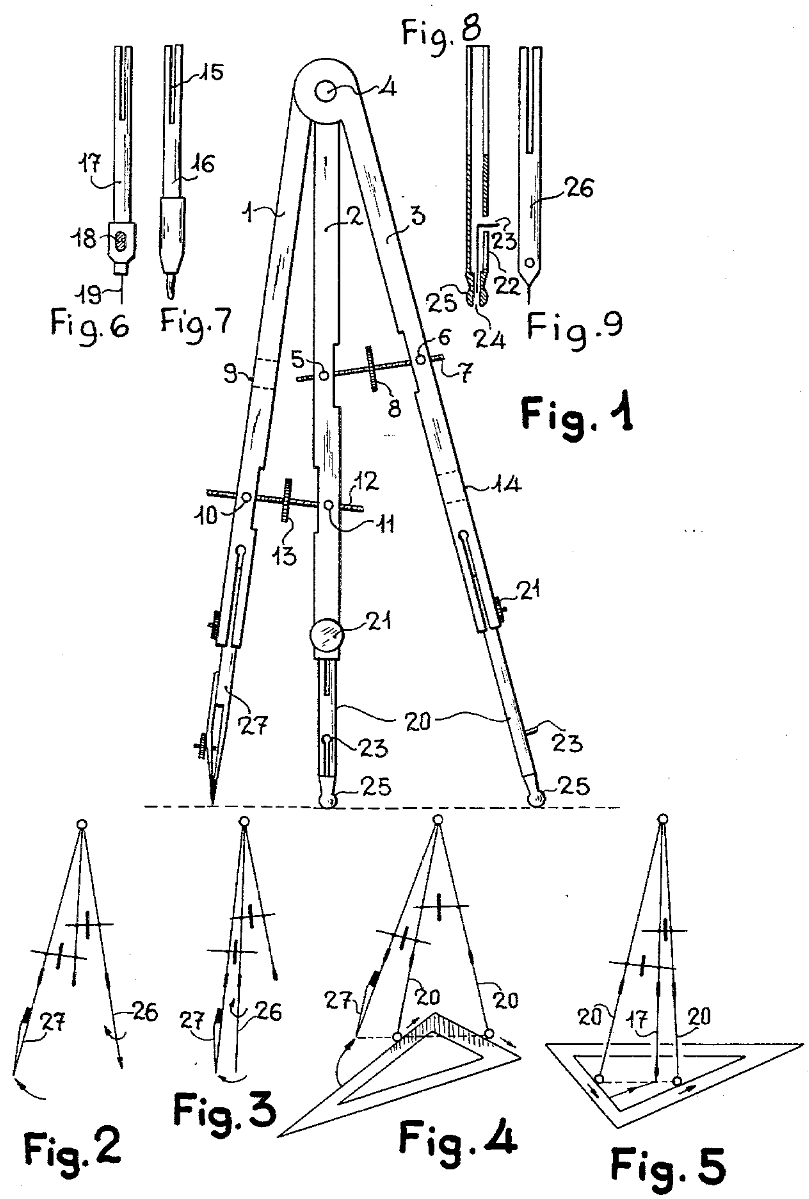
INVENTOR.
Joaquin Gomez Barquero
BY
Michael S. Striker
Atty United States Patent Office 3,214,835

Patented Nov. 2, 1965

3,214,835
COMPASS

Joaquin Gomez Barquero, Ibiza 23, Madrid, Spain

Filed June 20, 1962, Ser. No. 203,800
Claims priority, application Spain, July 11, 1961, 88,170
1 Claim. (Cl. 33—27)

This invention is concerned with a compass arrangement which, as a direct consequence of its special design, enables it to be used for performing a large number of operations; as a result it is of considerable utility in the drawing field in general, and for delineation or design in particular.

The compass of conventional design has achieved great perfection due to various causes, among which it is appropriate to emphasize its relative antiquity and its large field of use and distribution. Other compasses for special purposes are also known, but their use has reached much smaller fields because of the specialised nature of applications of such special compasses.

The multi-purpose compass which is the subject of this application is destined to fulfill an important role among the tools of the draughtsman or designer owing to the large number of uses to which it, as a single compass, can be put.

Among the infinite number of uses of a compass according to the invention there may be cited as particularly noteworthy that of permitting the tracing or drawing of ellipses by the simple and conclusively quick application of the general principle of the ellipsograph. Moreover, an increased number of possible combinations is obtained by the convenient use of the three legs possessed by the compass which are articulated to one another and which can be equipped with various accessories which greatly enhance the efficiency of the complete assembly.

The compass of the invention, in its arrangement for tracing or drawing ellipses, is based on the geometrical property that if a lineal segment bears at two of its points on two mutually perpendicular straight lines, the other points of the segment describe arcs of an ellipse the semi-axes of which are the distances from each point in question to the two fixed points of the segment which bear on the two straight lines. The lines determine precisely the directions of the axes of the ellipse.

By adjusting the arms of the compass so that the distances from the drawing pen or line-drawing device to the two remaining points or tips of the compass are equal to the two semi-axes of the ellipse which it is desired to draw, these two points are made to slide along the edge of both perpendicular sides of a triangle and the drawing of a quadrant of an ellipse is obtained. So that the points or tips may be able to slide, they are given a rounded form as mentioned in the description.

A complete description of said multiple-use compass is given hereinafter with reference to the accompanying drawings, in which there is shown, simply and diagrammatically and solely by way of non-limitative example, an embodiment of the invention in which it is possible to make whatsoever modifications of detail do not imply a fundamental change in its essential characteristics. In the drawings:

FIGURE 1 is a perspective view of the compass and a number of accessories therefor, and FIGURES 2 to 5 are diagrammatic views illustrating a number of examples of the use of the compass.

FIGS. 6–9 show various accessories.

According to FIGURE 1, the compass is formed by three arms 1, 2 and 3 which turn about a common axis 4 so that they move in a plane normal to that axis. Between the arms 2 and 3 there are two threaded swivel joints 5 and 6 through which there extends a double-threaded screw 7 which may be turned by a disc 8 to vary the angle formed between the arms 2 and 3. The screw 7 can extend loosely through an orifice 9 cut in the arm 1.

There are also provided another two threaded swivel joints 10 and 11 which, by means of a double-threaded screw 12 and disc 13, control the angle between the arms 1 and 2. The screw 12 can extend through an orifice 14 cut in the arm 3.

At the ends of the arms 1, 2 and 3 there are formed orifices with slots and clamping screws for attaching different types of supplementary parts or accessories.

One of the accessories 16 has the normal form of a compass pencil point and is distinguished in that the slot 15 is longer than normal and in that it does not have a stop which limits penetration into any socket in the arms 1, 2 and 3. Another accessory 17 is similarly slotted and terminates in an ink reservoir 18 and a small capillary tube 19 as a drawing pen.

Two further accessories 20 are each formed by a tubular part with a double slot, a securing means 21 for fixing the accessory and another slot 22 which renders it possible to shift a prong 23 permitting the point 24 thereof to project from a ball end 25 which completes the accessory against the action of an internal opposing spring. Lastly, there is also provided an accessory 26 with a point and another drawing pen accessory 27.

FIGURE 2 illustrates the use of the described assembly as a precision compass for drawing large radii, employing the accessory 26 in one outer arm and the drawing pen 27 in the other outer arm. In FIGURE 3, the accessory 26 is located in the central arm 2, whereby the compass draws circles of small radius.

It can be seen from FIGURE 4 how, with the accessory 27 in one outer arm and the two sliding accessories 20 in the other arms, the compass draws a quadrant of an ellipse, the ball ends resting against the outer edge of a right-angle triangle. These ellipses have large axes. In FIGURE 5 it is shown how, with the accessories 20 in the extreme arms 1 and 3 and the accessory 17 in the central arm 2, it is possible to draw small ellipses by causing the ball ends 25 to slide in the direction of the arrows along the inner edges of a triangle.

All secondary characteristics of the described compass such as form, materials, absolute or relative dimensions, etc., may vary, the construction nevertheless remaining within the scope of the present invention.

I claim:

A multi-purpose compass for drawing ellipses and circles comprising, in combination, a center arm and a pair of outer arms all pivotally connected at one end thereof to each other for pivotal movement about a common pivot axis with respect to each other substantially in one plane; a plurality of accessories selectively connectable to the other end of said arms, one of said accessories being a scribing accessory for producing a line during use of said compass, another of said accessories having a pointed end for fixing said end to a point of a drawing plane, and two of said accessories having rounded ends adapted to slide along guide surfaces on a drawing plane; a pair of screw means each having one end portion connected to said center arm intermediate the ends thereof and respectively at portions of said center arm longitudinally displaced from each other and another end portion respectively connected to one of said outer arms, said one end portion of each screw means projecting beyond said center arm toward that outer arm to which the other end portion of the other screw means is connected and each outer arm being provided with a clearance hole through which said one end portion may extend when said outer arms are pivoted with respect to said center arm to be closely adjacent to the latter; and means on the other ends of said arms for attaching any one of said accessories to each arm, whereby when said scribing accessory is attached to the other end of one arm and said accessory with said pointed end attached to the other end of another arm said compass may be used for drawing a circle, whereas when said scribing accessory is attached to the other end of one arm and said two accessories having rounded ends are attached to the other ends of the remaining arms said compass may be used for drawing an ellipse.

References Cited by the Examiner

UNITED STATES PATENTS

| | | | |
|---|---|---|---|
| 723,720 | 3/03 | Ostlund | 33—149 |
| 888,498 | 5/08 | Henrikson | 33—156 |
| 1,303,471 | 5/19 | Gross | 33—149 |
| 1,458,046 | 6/23 | Garlatti | 33—158 |
| 2,557,500 | 6/51 | Fairbanks | 33—27 |
| 2,655,727 | 10/53 | Varona et al. | 33—153 X |

FOREIGN PATENTS

| | | |
|---|---|---|
| 13,650 | 5/55 | France. |
| 1,189,633 | 3/59 | France. |
| 11,802 | 1886 | Great Britain. |
| 608,944 | 9/48 | Great Britain. |
| 174,917 | 9/06 | Germany. |
| 252,943 | 10/12 | Germany. |
| 407,605 | 12/24 | Germany. |
| 107,011 | 10/24 | Switzerland. |

ISAAC LISANN, *Primary Examiner.*